US009524164B2

(12) United States Patent
Olson et al.

(10) Patent No.: US 9,524,164 B2
(45) Date of Patent: Dec. 20, 2016

(54) SPECIALIZED MEMORY DISAMBIGUATION MECHANISMS FOR DIFFERENT MEMORY READ ACCESS TYPES

(71) Applicant: Advanced Micro Devices, Inc., Sunnyvale, CA (US)

(72) Inventors: Lena E. Olson, Madison, WI (US); Yasuko Eckert, Kirkland, WA (US); Srilatha Manne, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 517 days.

(21) Appl. No.: 14/015,282

(22) Filed: Aug. 30, 2013

(65) Prior Publication Data

US 2015/0067305 A1    Mar. 5, 2015

(51) Int. Cl.
| | | |
|---|---|---|
| *G06F 9/312* | (2006.01) | |
| *G06F 9/345* | (2006.01) | |
| *G06F 9/52* | (2006.01) | |
| *G06F 12/08* | (2016.01) | |
| *G06F 9/30* | (2006.01) | |
| *G06F 9/38* | (2006.01) | |

(52) U.S. Cl.
CPC ......... *G06F 9/30043* (2013.01); *G06F 9/3836* (2013.01); *G06F 9/3867* (2013.01); *G06F 9/3826* (2013.01); *G06F 9/3857* (2013.01); *G06F 12/0875* (2013.01)

(58) Field of Classification Search
CPC .. G06F 9/30043; G06F 9/3836; G06F 9/3867; G06F 12/0785; G06F 12/0875; G06F 9/3826

USPC ................................................. 712/225, 216
See application file for complete search history.

(56) References Cited

U.S. PATENT DOCUMENTS

| | | | | |
|---|---|---|---|---|
| 5,761,712 | A | * | 6/1998 | Tran et al. ..................... 711/126 |
| 5,781,790 | A | * | 7/1998 | Abramson et al. .............. 712/23 |
| 5,787,474 | A | | 7/1998 | Pflum |
| 5,813,033 | A | | 9/1998 | Pflum |
| 5,835,744 | A | | 11/1998 | Tran et al. |
| 6,108,769 | A | | 8/2000 | Chinnakonda et al. |
| 6,119,223 | A | * | 9/2000 | Witt .............................. 712/244 |
| 6,212,622 | B1 | | 4/2001 | Witt |
| 6,212,623 | B1 | | 4/2001 | Witt |

(Continued)

OTHER PUBLICATIONS

Keller, et al., U.S. Appl. No. 09/476,570, entitled "Scheduler Which Maintains Dependencies on an Instruction Basis", filed Jan. 3, 2000, 86 pages.

*Primary Examiner* — Daniel Pan
(74) *Attorney, Agent, or Firm* — Rory D. Rankin; Meyertons, Hood, Kivlin, Kowert & Goetzel, P.C.

(57) ABSTRACT

A system and method for efficient predicting and processing of memory access dependencies. A computing system includes control logic that marks a detected load instruction as a first type responsive to predicting the load instruction has high locality and is a candidate for store-to-load (STL) data forwarding. The control logic marks the detected load instruction as a second type responsive to predicting the load instruction has low locality and is not a candidate for STL data forwarding. The control logic processes a load instruction marked as the first type as if the load instruction is dependent on an older store operation. The control logic processes a load instruction marked as the second type as if the load instruction is independent on any older store operation.

17 Claims, 6 Drawing Sheets

(56) References Cited

U.S. PATENT DOCUMENTS

| | | | |
|---|---|---|---|
| 6,240,503 B1 | 5/2001 | Witt | |
| 6,266,744 B1 | 7/2001 | Hughes et al. | |
| 6,542,986 B1 | 4/2003 | White | |
| 7,222,226 B1 | 5/2007 | Lepak et al. | |
| 7,415,597 B2 | 8/2008 | Filippo et al. | |
| 2004/0143721 A1* | 7/2004 | Pickett et al. | 711/217 |
| 2004/0215934 A1* | 10/2004 | Yoaz | G06F 9/383 712/202 |
| 2010/0199045 A1* | 8/2010 | Bell et al. | 711/137 |
| 2011/0072214 A1* | 3/2011 | Li et al. | 711/124 |
| 2012/0023314 A1 | 1/2012 | Crum et al. | |
| 2014/0089592 A1* | 3/2014 | Biswas et al. | 711/133 |

\* cited by examiner

SPECIALIZED MEMORY DISAMBIGUATION MECHANISMS FOR DIFFERENT MEMORY READ ACCESS TYPES

BACKGROUND OF THE INVENTION

Field of the Invention

This invention relates to computing systems, and more particularly, to efficient predicting and processing of memory access dependencies.

Description of the Relevant Art

Modern microprocessors may include one or more processor cores, or processors, wherein each processor is capable of executing instructions of a software application. Ideally, every clock cycle produces useful execution of an instruction for each stage of a pipeline. However, a stall in a pipeline may cause no useful work to be performed during that particular pipeline stage. Stalls may occur due to at least cache misses and dependencies between instructions. To hide the penalty of stalls, microprocessors utilize out-of-order execution, simultaneous processing of multiple instructions, data forwarding or bypassing, and speculative execution based on predictions. Branch predictions and memory dependence predictions may be used in microprocessors.

Although data cache hits have smaller latencies than data cache misses, the hits may still consume multiple cycles to complete. The total number of processor cycles required to retrieve data from memory has been growing rapidly as processor frequencies have increased faster than system memory access times. However, in some cases, the requested data for a read operation, or a load instruction, may still be on the die of the processor core.

A store buffer may be used to buffer outstanding store instructions. The buffered store instructions may or may not have yet received the store data to send to a data cache in the memory hierarchy subsystem. One example of a data dependency between instructions is a read-after-write (RAW) hazard between a load instruction and an older store instruction. The load instruction, or a read operation, attempts to read a memory location that has been modified by an older (in program order) store instruction. When the load instruction is processed, the older store instruction may not have yet committed its results to the memory location.

In some cases, the load instruction may obtain its requested data from the memory subsystem, such as a data cache. In other cases, the load instruction may obtain the requested data from the store buffer. Typically, each of the sources, such as the data cache and the store buffer, are accessed in parallel by each load instruction although only one source has the correct requested data. A first type of load instruction may access a memory location with a relatively high spatial and/or temporal locality. The relatively high locality may correspond to both read and write accesses. Therefore, the first type of load instruction may have a high number of RAW data dependencies. Data forwarding may occur more frequently for this first type of load instruction. However, a second type of load instruction may not have high locality and accordingly, it is not a good candidate for data forwarding. At least two different types of load instructions with different locality include stack accesses and non-stack accesses. Each of the load instructions may be processed in a similar manner and access each of the possible sources for data although the load instructions correspond to different types.

In view of the above, efficient methods and mechanisms for efficient predicting and processing of memory access dependencies are desired.

SUMMARY OF EMBODIMENTS OF THE INVENTION

Systems and methods for efficient predicting and processing of memory access dependencies. In various embodiments, a computing system includes control logic for processing instructions of a computer program. The control logic may determine whether an instruction is a load instruction. In various embodiments, the control logic predicts whether the load instruction is a first type that benefits from data forwarding from the store buffer. One example of the first type is a stack access load instruction. The control logic may predict whether the load instruction is a second type of load instruction that does not benefit from data forwarding from the store buffer. For example, the second type of load instruction may not have high locality corresponding to both read and write accesses. One example of the second type is a non-stack access. A heap access is a subset of non-stack accesses. Multiple criteria may be used for this determination between the first type and the second type. In some embodiments, later pipeline stages may also be used to perform or verify the prediction. For example, at least the execution pipeline stage or the memory access pipeline stage, or both pipeline stages may perform verification and may override the earlier prediction, which may have occurred in a decode pipeline stage. Alternatively, the decode pipeline stage may not perform the prediction, but later pipeline stages, such as the execution and memory access pipeline stages, do perform the prediction.

In various embodiments, the control logic processes a load instruction marked as a first type, such as a stack access in one example, as if the load instruction is dependent on an older (in program order) store instruction. The older (in program order) store instruction is older in the processor pipeline than the load instruction, and the store instruction occurs earlier than the load instruction in the computer program. The control logic processes a load instruction marked as a second type, such as a non-stack access in one example, as if the load instruction is independent on any older (in program order) store instruction. The control logic may block access of a data cache for a load instruction marked as the first type, but allow access into a store buffer. In some embodiments, the control logic may initially block access of the store buffer for a load instruction marked as the second type, but allow access into the data cache. Verification occurs in a later pipeline stage. A misprediction causes recovery steps to occur.

These and other embodiments will become apparent upon reference to the following description and accompanying drawings.

Figure 1:
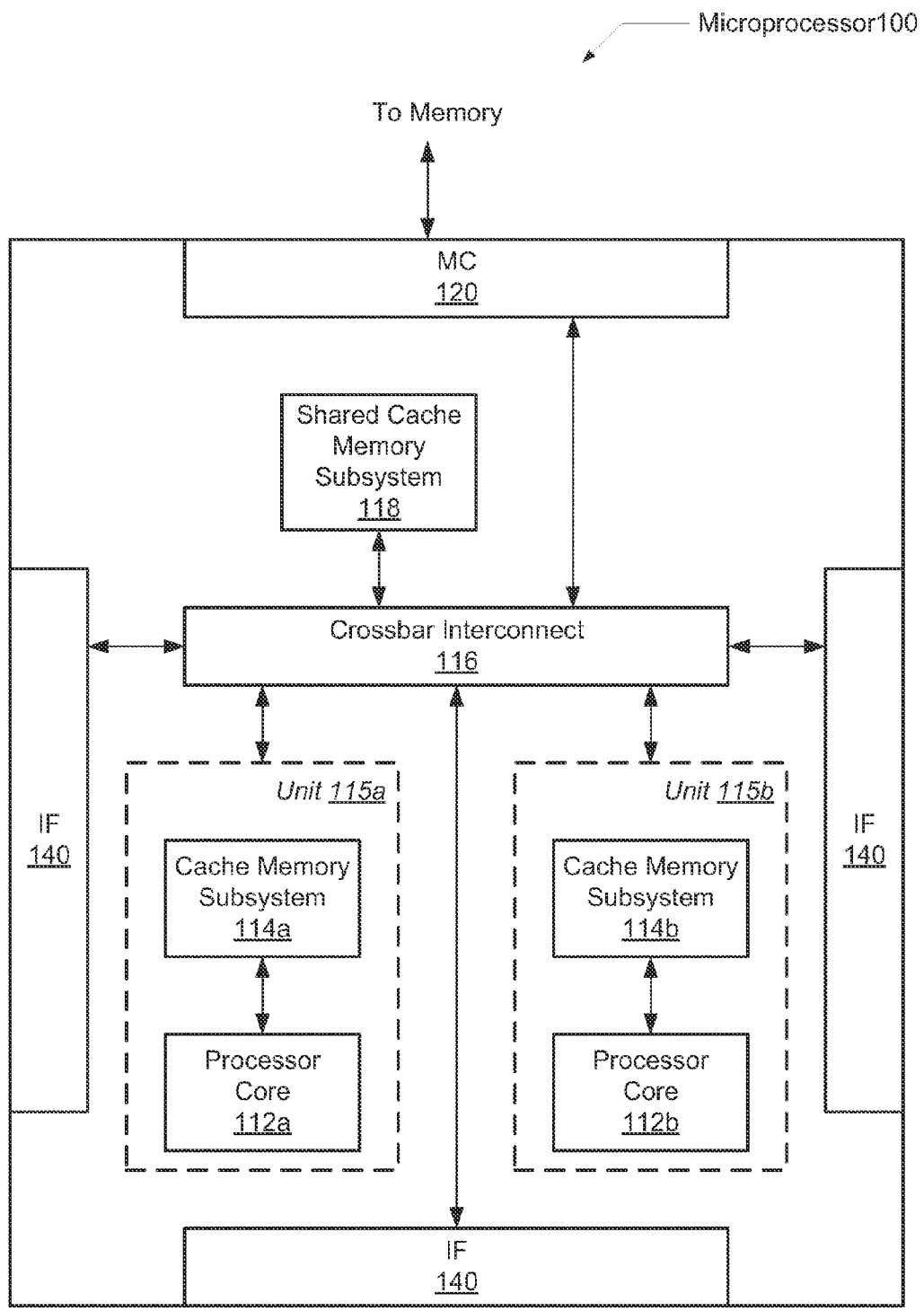
FIG. 1 is a generalized block diagram illustrating one embodiment of an exemplary microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of an exemplary processor 100 is shown. Processor 100, which in the illustrated embodiment is a microprocessor, may include memory controller 120, interface logic 140, one or more processing units 115a-115b, which may include one or more processor cores 112a-112b and corresponding cache memory subsystems 114a-114b; crossbar interconnect logic 116, and a shared cache memory subsystem 118. In one embodiment, the illustrated functionality of microprocessor 100 is incorporated upon a single integrated circuit.

Interface 140 generally provides an interface for input/output (I/O) devices off the microprocessor 100 to the shared cache memory subsystem 118 and processing units 115a-115b. I/O devices may include peripheral network devices such as printers, keyboards, monitors, cameras, card readers, hard or floppy disk drives or drive controllers, network interface cards, video accelerators, audio cards, modems, a variety of data acquisition cards such as General Purpose Interface Bus (GPIB) or field bus interface cards, or other. Additionally, interface 140 may be used to communicate with other microprocessors and/or other processing nodes. Generally, interface logic 140 may comprise buffers for receiving packets from a corresponding link and for buffering packets to be transmitted upon a corresponding link. Any suitable flow control mechanism may be used for transmitting packets to and from microprocessor 100.

Microprocessor 100 may be coupled to a respective memory via a respective memory controller 120. Memory may comprise any suitable memory devices. For example, a memory may comprise one or more RAMBUS dynamic random access memories (DRAMs), synchronous DRAMs (SDRAMs), DRAM, static RAM, etc. The address space of microprocessor 100 may be divided among multiple memories. Each microprocessor 100 or a respective processing node comprising microprocessor 100 may include a memory map used to determine which addresses are mapped to which memories, and hence to which microprocessor 100 or processing node a memory request for a particular address should be routed. In one embodiment, the coherency point for an address is the memory controller 120 coupled to the memory storing bytes corresponding to the address. Memory controllers 120 may comprise control circuitry for interfacing to memories. Additionally, memory controllers 120 may include request queues for queuing memory requests. In addition to the above, memory controllers 120 may include or be coupled to a prefetch unit.

Generally speaking, crossbar interconnect logic 116 is configured to respond to received control packets received on the links coupled to Interface 140, to generate control packets in response to processor cores 112a-112b and/or cache memory subsystems 114a-114b, to generate probe commands and response packets in response to transactions selected by memory controller 120 for service, and to route packets for an intermediate node which comprises microprocessor to other nodes through interface logic 140. Interface logic 140 may include logic to receive packets and synchronize the packets to an internal clock used by crossbar interconnect 116. Crossbar interconnect 116 may be configured to convey memory requests from processor cores 112a-112b to shared cache memory subsystem 118 or to memory controller 120 and the lower levels of the memory subsystem. Also, crossbar interconnect 116 may convey received memory lines and control signals from lower-level memory via memory controller 120 to processor cores 112a-112b and caches memory subsystems 114a-114b and 118. Interconnect bus implementations between crossbar interconnect 116, memory controller 120, interface 140, and processor units 115a-115b may comprise any suitable technology.

Cache memory subsystems 114a-114b and 118 may comprise high-speed cache memories configured to store blocks of data. Cache memory subsystems 114a-114b may be integrated within respective processor cores 112a-112b. Alternatively, cache memory subsystems 114a-114b may be coupled to processor cores 112a-112b in a backside cache configuration or an inline configuration, as desired. Still further, cache memory subsystems 114a-114b may be implemented as a hierarchy of caches. Caches, which are nearer processor cores 112a-112b (within the hierarchy), may be integrated into processor cores 112a-112b, if desired. In one embodiment, cache memory subsystems 114a-114b each represent L2 cache structures, and shared cache subsystem 118 represents an L3 cache structure.

Both the cache memory subsystems 114a-114b and the shared cache memory subsystem 118 may include a cache memory coupled to a corresponding cache controller. Processor cores 112a-112b include circuitry for executing instructions according to a predefined general-purpose instruction set. The x86® instruction set architecture (ISA) may be selected. Alternatively, the x86-64®, Alpha®, PowerPC®, MIPS®, SPARC®, PA-RISC®, or any other instruction set architecture may be selected. Generally, processor core 112a-112b accesses the cache memory subsystems 114a-114b, respectively, for data and instructions. If the requested block is not found in cache memory subsystem 114a-114b or in shared cache memory subsystem 118, then a read request may be generated and transmitted to the memory controller 120 en route to the location to which the missing block is mapped.

Figure 2:
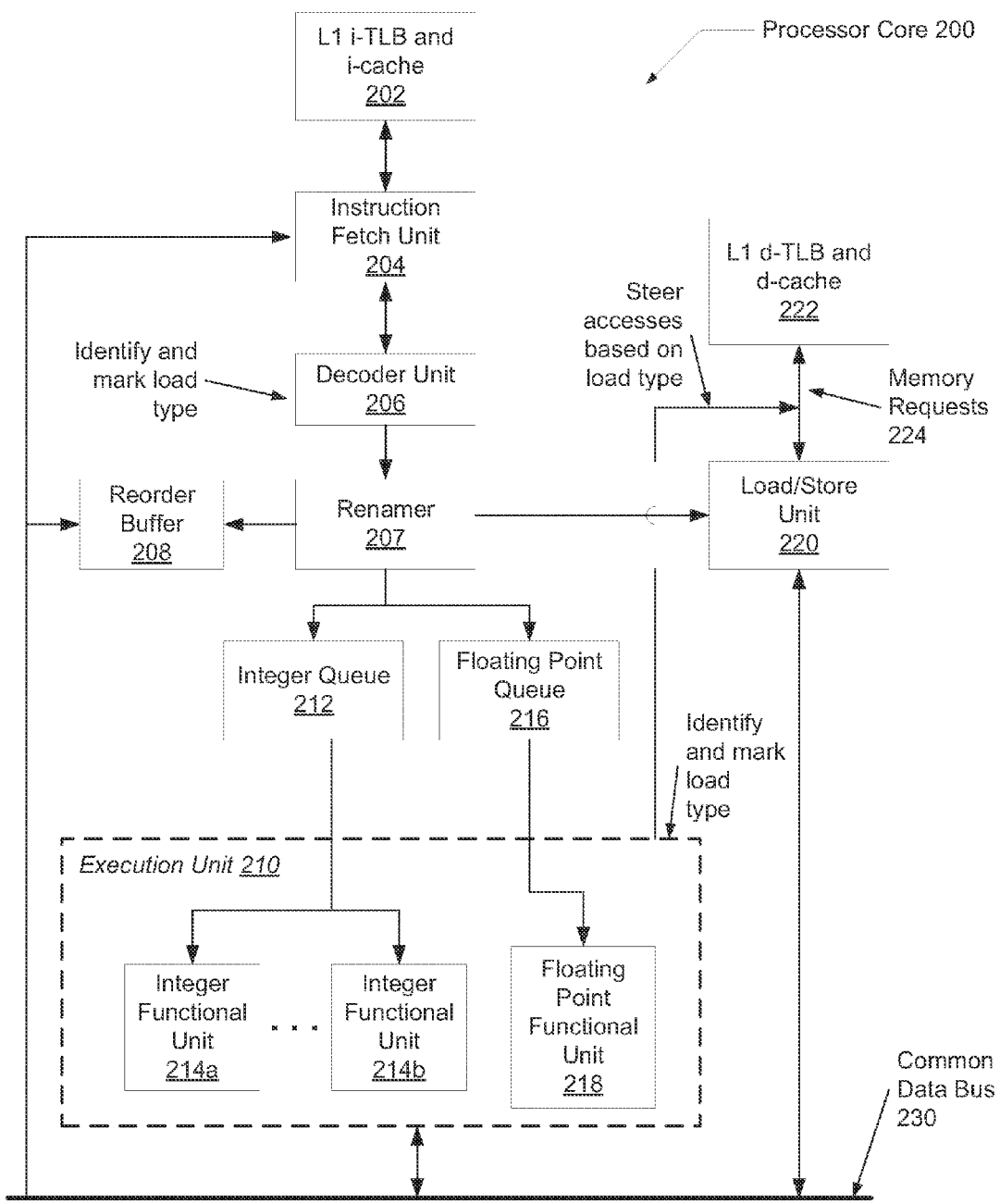
FIG. 2 is a generalized block diagram illustrating one embodiment of a general-purpose processor core that performs out-of-order execution.

FIG. 2 illustrates one embodiment of a general-purpose processor core 200 that performs out-of-order execution. An instruction-cache (i-cache) may store instructions for a software application and a corresponding translation-lookaside-buffer (TLB) 202 may store translated addresses in order to access the instructions. Both caches 202 and 222 may be located within processor core 200 or located outside such as in cache memory subsystem 114a-114b of FIG. 1. The instruction fetch unit (IFU) 204 may fetch multiple instructions from the i-cache 202 per clock cycle if there are no i-cache misses. The IFU 204 may include a program counter that holds a pointer to an address of the next instructions to fetch in the i-cache 202, which may be compared to addresses in the i-TLB. The IFU 204 may also include a branch prediction unit to predict an outcome of a conditional instruction prior to an execution unit determining the actual outcome in a later pipeline stage.

The decoder unit 206 decodes the opcodes of the multiple fetched instructions and may allocate entries in an in-order retirement queue, such as reorder buffer 208. The reorder buffer 208 may be used for out-of-order instruction issue to execution units. Alternatively, a scheduler may be used for out-of-order issue of instructions, rather than the reorder buffer 208. Register renaming logic in the renamer 207 may be used between the decoder 206 and the reorder buffer 208 or an optional scheduler or other instruction issue logic.

The decoder 206 may determine an instruction is a load instruction. Additionally, the decoder 206 may determine the load instruction is a first type of load instruction that benefits from data forwarding from the store buffer. This first type of load instruction may have a significant likelihood of having a memory dependence on an older outstanding store instruction. One example of this first type of load instruction is a stack access. Alternatively, the decoder 206 may determine the load instruction is a second type of load instruction that does not benefit from data forwarding from the store buffer. This second type of load instruction may have a low likelihood of having a memory dependence on an older outstanding store instruction. One example of this second type of load instruction is a non-stack access. One example of a non-stack access is a heap access although non-stack accesses include other accesses that are not heap accesses. The heap access is a subset of the non-stack accesses. In various embodiments, marking a load instruction as the first type or the second type may include asserting or deasserting a bit in information conveyed throughout the processor core 200 for the load instruction.

The stack is a region of memory that stores temporary variables, such as local variables, created by a function call in a computer program. In addition, spill code may use the stack when there are not a sufficient number of logical registers. The stack is a first-in-last-out (FILO) data structure managed by the operating system. Each new variable declared by the function call is pushed onto the stack. When the function call exits, each of the declared variables are freed or popped from the stack. The heap is a region of memory that is allocated and deallocated by instructions in a computer program inserted by the software developer. Variables created in the heap are accessible by any function in the computer program making them global.

A stack pointer for the stack is typically a value stored in a hardware register. The stack pointer typically indicates the most recently allocated memory location on the stack. The stack pointer may move in a direction away from the origin when the stack grows and move toward the origin when the stack shrinks. When the stack has a value of zero, the stack pointer may be pointing to the origin of the stack. Push and pop operations may be used to update the stack pointer and update the size of the stack. The size of the data or variable may determine the amount of the stack pointer update and the amount of the stack size adjustment. In the x86® instruction set architecture (ISA), the extended stack pointer (ESP) or RSP register is used to store the stack pointer value.

In some embodiments, the decoder 206 may mark the load instruction as the first type that benefits from data forwarding from the store buffer, such as a stack access, in response to determining at least one source register identifier (ID) for the load instruction matches a stack pointer register ID. In other embodiments, the decoder 206 may mark the load instruction as the first type, in response to determining a source register identifier (ID) matches another register ID detected to hold the stack pointer register value. For example, the contents of the stack pointer may have been copied to another architectural register.

In yet other embodiments, the decoder 206 may mark the load instruction as the first type in response to determining an immediate address in an immediate load instruction is within a given address range for a stack. In further other embodiments, the decoder 206 may mark the load instruction as the first type in response to determining a source register stores the stack pointer value using one of the above methods and an offset value in the load instruction falls within a given range for a stack.

As described earlier, the decoder 206 and other control logic throughout the processor core 200 may recognize that stack accesses tracking may also track assignments of the stack pointer register to other registers as well. During later pipeline stages, such as when accessing the store buffer, the stack pointer value may be compared with a virtual address that has been calculated and possibly translated. In some embodiments, the decoder 206 may mark the load instruction as the second type that does not benefit from data forwarding from the store buffer, such as a non-stack access, in response to determining no source register for the load instruction matches the stack pointer register ID.

Marking the load instruction as a first type or a second type may allow prediction logic to provide better results. Control logic throughout the processor core 200 may process a load instruction indicated as a first type, such as a stack access, as if the load instruction is dependent on an older (in program order) store operation. The older (in program order) store instruction is older in the processor pipeline than the load instruction, and the store instruction occurs earlier than the load instruction in the computer program. The control logic throughout the processor core 200 may process a load instruction indicated as a second type, such as a non-stack access, as if the load instruction is independent of any older (in program order) store operation.

Given logic may utilize the indication of whether a load instruction is a stack access or a non-stack access. For stack accesses, control logic may delay allowing the load instruction to access the store buffer until all older outstanding store instructions have resolved addresses. An access request to the data cache may be prevented for this load instruction indicated as the first type, or as a stack load access. The stack load access may be predicted to be dependent on an older store instruction. Therefore, the stack load access has some processing delayed in order to allow the older store instruction to at least resolve its store address for identification of the memory dependence and later to obtain its corresponding store data for forwarding purposes. In contrast, a non-stack access may be predicted to be independent of older store instructions. Therefore, the non-stack load access may have an access request sent to the data cache unlike processing for the stack access. In some embodiments, the non-stack load access may not access the store buffer. Other logic changes may be performed to ensure correct operation due to the lack of an access of the store buffer. Further details are provided later.

In some embodiments, a buffer or other data structure may be used to store identification of load instructions that do not behave according to its stack or non-stack indication. The identification stored in the data structure may include at least a program counter (PC). The load instructions stored in this data structure may have a relatively high rate of first type/second type (or stack/non-stack) misprediction. If a given load instruction hits in the data structure when accessed, then a more conservative approach or a different approach may be taken by control logic throughout the processor core 200 while processing the given load instruction. For example, the given load instruction may access each of the store buffer and the data cache when its load address is resolved. An indication, such as a bit, of whether the load instruction is a stack or a non-stack access may be flipped when a hit occurs in the data structure. Alternatively, another bit may be used to cause other processing to occur, which is further explained later.

In some embodiments, entries within integer queue 212 and entries within the floating-point queue 216 may be allocated when instructions are issued. In other embodiments, the entries in the queues 212 and 216 are allocated after instructions are renamed and these instructions are later issued from the queues 212 and 216. In yet other embodiments, the queues 212 and 216 are combined in a unified queue. Instructions may be issued when source operands are indicated as being available and no further delay is indicated by control logic. Entries of an input queue within the load/store unit 220 may also be allocated following the allocations within the queues 212 and 216 or concurrently, if desired. The allocation of entries in the execution unit 210 is considered issue. A discussion of the execution unit 210 will follow a description of memory accesses.

Memory accesses such as load and store operations typically allocate entries in the load/store unit 220. The load/store unit 220 may include queues or buffers and logic to execute a memory access instruction. Also, verification logic may reside in the load/store unit 220 to ensure a load instruction receives correct data either from the data cache or forwarded from the correct youngest of the older store instructions. The load/store unit 220 may send memory access requests 224 to the one or more levels of the data cache (d-cache) 222 on the chip. Each level of cache may have its own TLB for address comparisons with the memory requests 224. Each level of cache 222 may be searched in a serial or parallel manner. If the requested memory line is not found in the caches 222, then a memory request 224 is sent to lower levels of cache memory such as caches 114*a*-114*b* and 118, or possibly to off-chip memory. The serial or parallel searches, the possible requests to other memory, and the wait for the requested memory line to arrive may require a substantial number of clock cycles.

Control logic in or outside of the load/store unit (LSU) 220 and the data cache 222 may utilize the indication of whether a load instruction is the first type or the second type, such as a stack access or a non-stack access. For stack accesses, in some embodiments, control logic may block access of the data cache 222. The stack access may be predicted to be dependent on an older store instruction. Therefore, the stack access is predicted to obtain its result data from the store buffer in the LSU 220. The stack access may access a store buffer in the LSU 220. In contrast, in some embodiments, control logic may block access of the store buffer in the LSU 220 for non-stack accesses. The non-stack access may be predicted to be independent of older store instructions. Therefore, the non-stack access is predicted to obtain its result data from the data cache 222.

In such cases, verification occurs in a later pipeline stage. If the non-stack access is blocked from accessing the store buffer and verification steps determine misspeculation, then load replay or another recovery mechanism may be used due to the incorrect source of the result data.

In various embodiments, using the indication of the first type or second type, such as a stack access or a non-stack access, for load instructions may reduce parallel accesses of the LSU 220 and the data cache 222. The stack/non-stack indication may reduce a number of read ports for the data cache 222 and reduce the use of the read ports. Further the stack/non-stack indication may increase the instruction issue bandwidth.

If a stack/non-stack misprediction occurs for a given load instruction, then recovery steps occur and an indication of the misprediction may be used for processing future occurrences of the given load instruction. A description of the mispredictions is given first followed by storing a corresponding indication. In one example, the given load instruction may be currently marked as the first type, such as a stack access. During processing, the given load instruction may be blocked from accessing the d-cache 222. The given load instruction may be delayed to access the store buffer until all older store instructions have resolved addresses. However, the resolved address of the given load instruction may miss in the store buffer. Therefore, now the given load instruction may access the d-cache 222 after the misprediction is found. The given load instruction still gets its result and correctness is maintained, but the latency for completion increased due to the misprediction.

Due to the misprediction, the PC of the given load instruction may be stored in a buffer or other data structure as described earlier for instruction issue. The buffer may be accessed prior to any access of the LSU 220 and the data cache 222. If a given load instruction hits in the buffer, then a more conservative approach may be taken by control logic throughout the processor core 200 while processing the given load instruction. For example, each of the store buffer and the data cache 222 in the LSU 220 may be accessed with the load resolved address. Alternatively, the given load instruction may have its memory access step reversed from accessing the data cache 222 to accessing the store buffer in the LSU 220 or vice-versa.

Results from the execution units 210, the LSU 220, and the data cache 222 may be presented on a common data bus 230. The results may be sent to the reorder buffer 208. In one embodiment, the reorder buffer 208 may be a first-in first-out (FIFO) queue that ensures in-order retirement of instructions according to program order. Here, an instruction that receives its results is marked for retirement. If the instruction is head-of-the-queue, it may have its results sent to a corresponding architecture register file. Each of queues 212 and 216 may hold a corresponding architecture register file. The architecture register file may hold the architectural state of the general-purpose registers of processor core 200. Then the instruction in the reorder buffer may be retired in-order and its head-of-queue pointer may be adjusted to the subsequent instruction in program order.

The results on the common data bus 230 may be sent to execution unit 210 in order to forward values to operands of instructions waiting for the results. For example, an arithmetic instruction may have operands that depend on the results of a previous arithmetic instruction, or a load instruction or a store instruction may need an address calculated by an address generation unit (AGU) in the functional units 214. When these waiting instructions have values for their operands and hardware resources are available to execute the instructions, they may be issued out-of-order from the respective queues 212 and 216 to the appropriate resources in the functional units 214 and 216 or the load/store unit 220.

Uncommitted, or non-retired, memory access instructions have entries in the load/store unit 220. The forwarded data value for an in-flight, or uncommitted, load instruction from the youngest uncommitted older store instruction may be placed on the common data bus 230 or may be simply routed to the appropriate entry in the load buffer within the load/store unit 220.

Returning to execution unit 210, the queues 212 and 216 may store corresponding integer and floating-point instructions that wait for their operands to become available. Register renaming may occur in renamer 207 and execution scheduling may occur within queues 212 and 216 or within surrounding corresponding circuitry not shown. When operands are available and hardware resources are also available, and no delays are caused by other control logic, an instruction may be issued out-of-order from the queues 212 and 216 to the integer functional units 214, the floating-point functional unit 218, and/or to the load/store unit 220. Each set of integer functional units 214 may include arithmetic logic units (ALU's) for integer computational calculations such as addition, subtraction, address-generation, determination of an outcome of a branch conditional instruction, multiplication, division, or otherwise. The floating-point functional unit 218 may include circuitry to perform floating-point addition, subtraction, multiplication, division, square root, integer to floating-point conversion, floating-point to integer conversion, or other.

In one embodiment, multiple integer functional units 214 may be instantiated in order to increase microprocessor instruction throughput. For example, processor core 200 may be configured to execute multiple software threads of execution. An operating system for microprocessor 100, and corresponding processor core 200, allocates regions of memory for a software application. When a software application is compiled, the application may comprise multiple processes. In such an embodiment, each process may own its own resources such as an image of memory, or an instance of instructions and data before application execution. Also, each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Each process of the software application may be further split into software threads. Many modern microprocessors are configured to simultaneously execute two or more software threads. These microprocessors may have two or more hardware threads, or strands, available for parallel execution and assignment by the kernel of the operating system. For example, for a multi-threaded microprocessor, each integer functional unit 214 may receive one or more integer instructions of a particular thread per clock cycle depending on availability of hardware resources within a particular unit 214. The circuitry from instruction fetch unit 204 to integer queue 212 may be modified to manage the two or more strands of processor core 200 without duplicating the hardware of each unit. For example, registers holding architecture state of a thread may be duplicated, but execution hardware resources may not be duplicated. Additionally, control logic and data structures may be duplicated, wherein the logic and data structures may be used for determining whether a load instruction is a stack access or a non-stack access, and for determining whether to block access to the d-cache or the store buffer.

Figure 3:
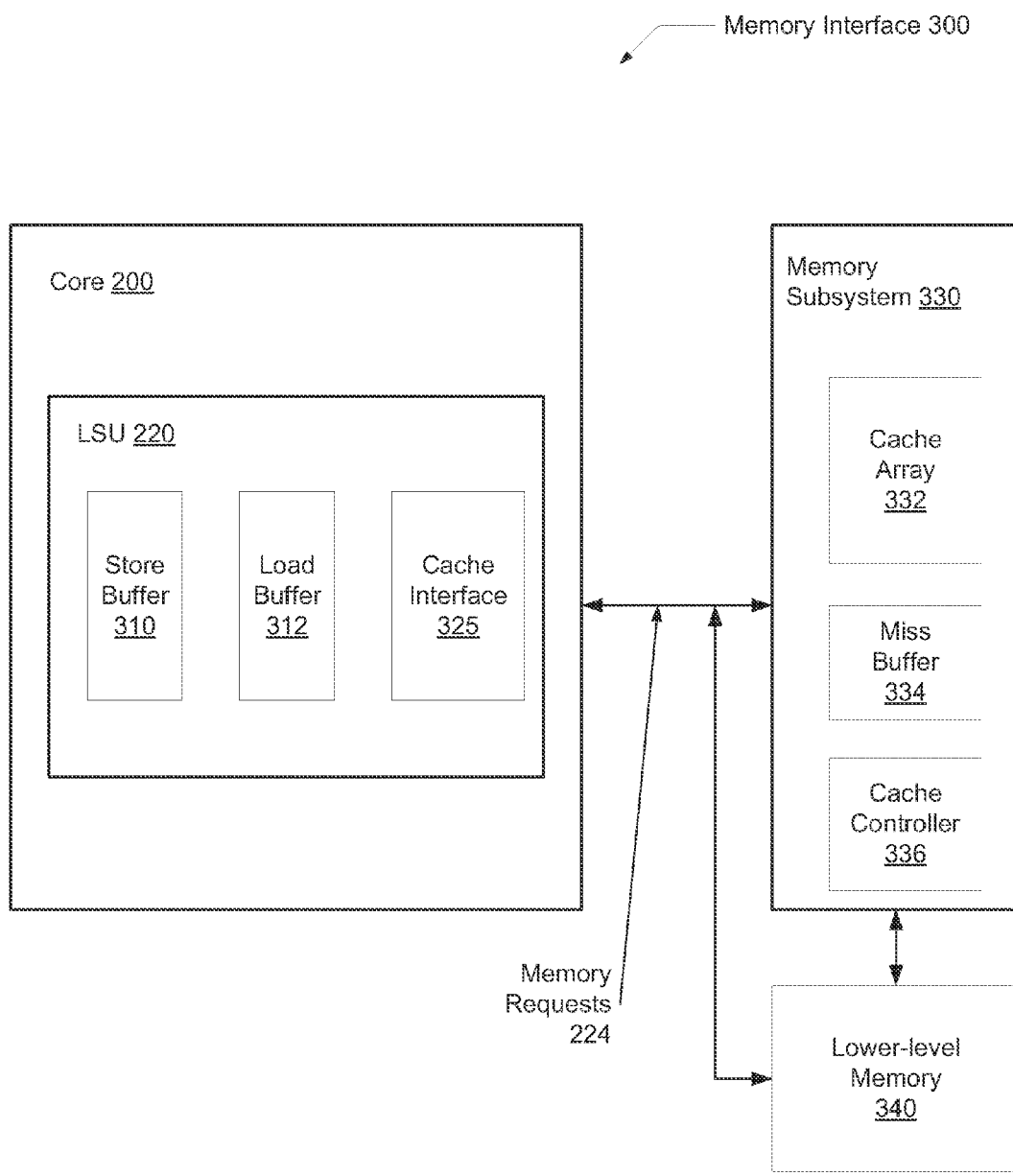
FIG. 3 is a generalized block diagram illustrating one embodiment of a memory interface illustrating different sources of memory requests.

Referring now to FIG. 3, one embodiment of a memory interface 300 is shown. It is noted the components shown in FIG. 3 illustrate a general organization and coupling of components, rather than an actual physical placement of the components. Circuitry and logic used in FIG. 2 and used in FIG. 3 are numbered accordingly. Examples of physical placements may be found in FIG. 1 and FIG. 2. In one embodiment, a memory subsystem 330 comprises a cache array 332 that may correspond to an on-core L1 cache of a computing system with an accompanying miss buffer 334. A cache controller 336 may include control logic and configuration and status registers (CSR's) for storing programmable values used by the control logic. Cache array 332 and the cache controller 336 may service demand requests from store buffer 310 and load buffer 312. The hit/miss status of each request serviced by memory subsystem 330 may be conveyed from memory subsystem 330 to LSU 220.

Lower-level memory 340 may comprise main memory of the computing system. Alternatively, the lower-level memory 340 may include one or more levels of cache hierarchy located prior to a main memory of the computing system. The cache memory 332 may be coupled to lower-level memory 340. In various embodiments, a prefetch unit is coupled to the memory subsystem 330. The prefetch unit may be located between the memory subsystem 330 and the lower-level memory 340. In other embodiments, the prefetch unit may be located within the memory subsystem 330. In yet other embodiments, the prefetch unit may be located within the core 200. The prefetch unit may generate speculative prefetch requests via memory subsystem 330 or independently from memory subsystem 330.

A speculative prefetch request from a prefetch unit may be intended to bring data into cache memory 332 prior to when the data is actually needed, which may reduce a latency associated with memory accesses. For example, load instructions marked as a non-stack access may be predicted to have a low likelihood of using data forwarding. Therefore, the likelihood may be high that the requested data is in the memory subsystem 330, such as the cache array 332. Increasing the likelihood of a cache hit with prefetching data may reduce the latency associated with a memory access, such as at least the load instruction marked as a non-stack access.

In one embodiment, the miss buffer 334 comprises a plurality of entries that queues all read and write operations, such as load, prefetch, and store instructions, which encounter conditions that prevent them from completing. For example, a requested cache line may not be present in cache array 332. Alternatively, a requested cache line may be present in cache memory, but it does not have a particular cache coherency state. For example, a cache miss may occur for a store operation when a corresponding cache line in cache array 332 is not in an exclusive state of a cache coherency protocol. A subsequent state change request may be sent, which includes additional latency to service the store operation. The cache controller 336 may be responsible for ensuring that all memory requestors will see a consistent and proper ordering of store operations.

Memory requests may originate at least from the IFU 202, other instruction scheduling logic, a store buffer 310, and a load buffer 312. As described above, IFU 202 may be configured to select a thread to be fetched and to fetch instructions from i-cache 205 for the selected thread, which may correspond to an L1 cache with a corresponding L2 cache memory 332 in FIG. 3. Store buffer 310 may be configured to convey memory requests to the same L1 and L2 caches for chosen threads in order to write-out data of committed store instructions for a chosen thread. In some embodiments, the store buffer 310 contains entries for storing addresses and data for store instructions. In other embodiments, the store address and store data are contained in separate data structures. The store buffer 310 may contain information for both uncompleted and completed but not-yet-retired ("in-flight") store instructions. The store buffer 310 may be a content-addressable-memory (CAM) indexed by a memory access address. With the use of the store buffer 310, store instructions may execute ahead of unresolved speculative instructions but not committing their values until retirement. In other embodiments, another data structure may be used to store information of store instructions that have completed and are ready to retire.

Load buffer 312 may be configured to convey memory requests to the same L1 and L2 caches for a chosen thread in order to read data of load instructions being executed. The load buffer 312 may contain information for both uncompleted and completed but not-yet-retired ("in-flight") load instructions. The load buffer 312 may be a content-addressable-memory (CAM) indexed by a memory access address. In some embodiments, store instructions with resolved store addresses may search the load buffer for any premature load instructions to prevent memory order violations. In other embodiments, completed store instructions with both a resolved address and store data that are ready to retire may search the load buffer 312 for any premature load instructions to prevent store-to-load order violations. In other embodiments, another data structure may contain information for load and store instructions waiting to send memory requests to the memory subsystem 330.

Accesses for load instructions to the LSU 220 and the memory subsystem 330 may be determined by an indication of whether the load instruction is a stack access or a non-stack access as described earlier. Additionally, if the PC of the load instruction is stored in a data structure indicating problematic or reverse behavior load instructions, the accesses may be further altered. In some embodiments, a store-to-load-forwarding (STLF) predictor may be accessed by a resolved address or a PC of a given load instruction marked as the second type, such as a non-stack access. A hit may indicate the load instruction is to access the store buffer 310 and possibly skip access of the cache array 332. A miss may indicate the load instruction is to access the cache array 332 and possibly skip access of the store buffer 310. Therefore, processing of the load instruction may be changed after the initial mark as the second type when a separate predictor is used. Similarly, processing for a load instruction marked as the first type may also be altered based on accessing the separate predictor. Alternatively, prediction information within the separate predictor may be updated based on the hit/miss result of the access, but processing may or may not be changed for the load instruction at this time. In some examples, the prediction information is a 2-bit saturating counter.

As described earlier, the load instruction may be indicated to be a stack access and accordingly access the store buffer 310 without accessing the cache array 332 unless a stack/non-stack misprediction occurs. In contrast, a non-stack access load instruction may access the cache array 332 without simultaneously accessing the store buffer 310. However, during a later verification step, the load buffer 312 may be accessed by a resolved address of a store instruction ready to retire. If the resolved address hits in the load buffer 312 and a stored indication indicates the load instruction is a non-stack load (accesses only the data cache for requested data) and the load instruction corresponding to the hit is indicated to be completed, then recovery steps are performed. For example, load replay is performed. In other embodiments, a non-stack access load instruction accesses the store buffer 310 and the cache array 332 in parallel. A store instruction in the store buffer 310 may access the load buffer 312 with a resolved address when the address is resolved, rather than when the store instruction is retiring.

Figure 4:
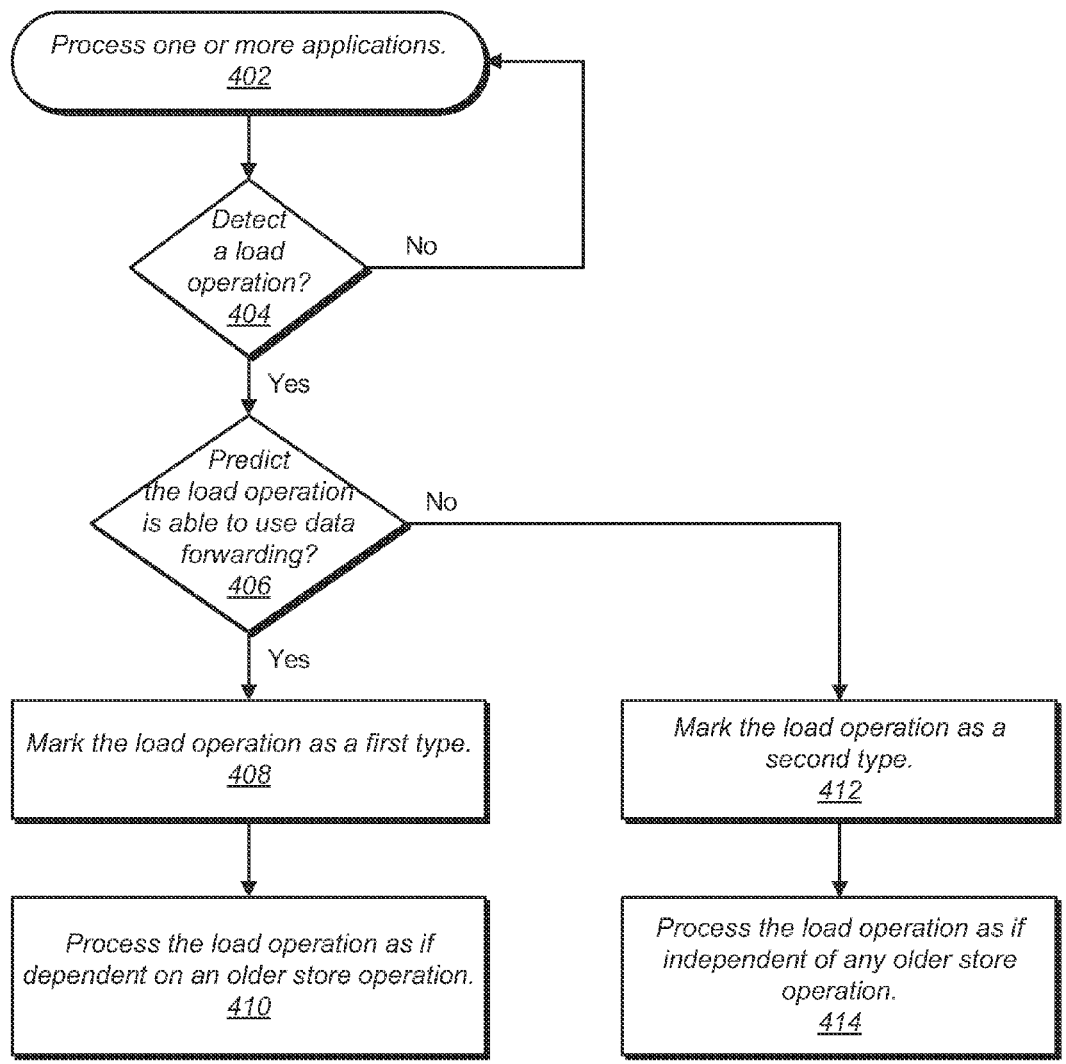
FIG. 4 is a flow diagram of one embodiment of a method for an efficient cache efficiently predicting and processing of memory access dependencies.

Referring now to FIG. 4, a generalized flow diagram of one embodiment of a method 400 for efficiently predicting and processing of memory access dependencies is illustrated. The components embodied in the computing system and cache storage arrangements described above may generally operate in accordance with method 400 and the below methods. Additionally, program instructions, or generally software, executable by a processor may cause operation in accordance with method 400 and the below methods. For purposes of discussion, the steps in this embodiment are shown in sequential order. However, some steps may occur in a different order than shown, some steps may be performed concurrently, some steps may be combined with other steps, and some steps may be absent in another embodiment.

In block 402, instructions of one or more software applications may be processed. The instructions may be fetched, decoded, renamed, issued and executed. If a load instruction (read operation) is detected (conditional block 404) and the load instruction is determined to be a first type that benefits from data forwarding from the store buffer, such as a stack access, (conditional block 406), then in block 408, the load instruction may be marked as the first type. The prediction may be performed as described earlier for stack and non-stack accesses. For example, in the determination the decoder 206 may use the source registers, an immediate address value, and an offset and comparisons to an address range associated with the stack. Additional data structures and predictors may also be used in combination with the logic determining whether a load instruction is a stack access or a non-stack access. The combination of the data structures and control logic may predict a memory location accessed by the load instruction has read and write spatial and/or temporal locality that exceeds a given threshold. In block 410, the load instruction indicated to be the first type is processed as if the load instruction is dependent on an older store operation.

If a load instruction (read operation) is detected (conditional block 404) and the load instruction is not determined to be the first type (conditional block 406), then in block 412, the load instruction may be marked as a second type that does not benefit from data forwarding from the store buffer, such as a non-stack access. In block 414, the load instruction indicated to be the second type is processed as if the load instruction is independent of any older store operation.

Figure 5:
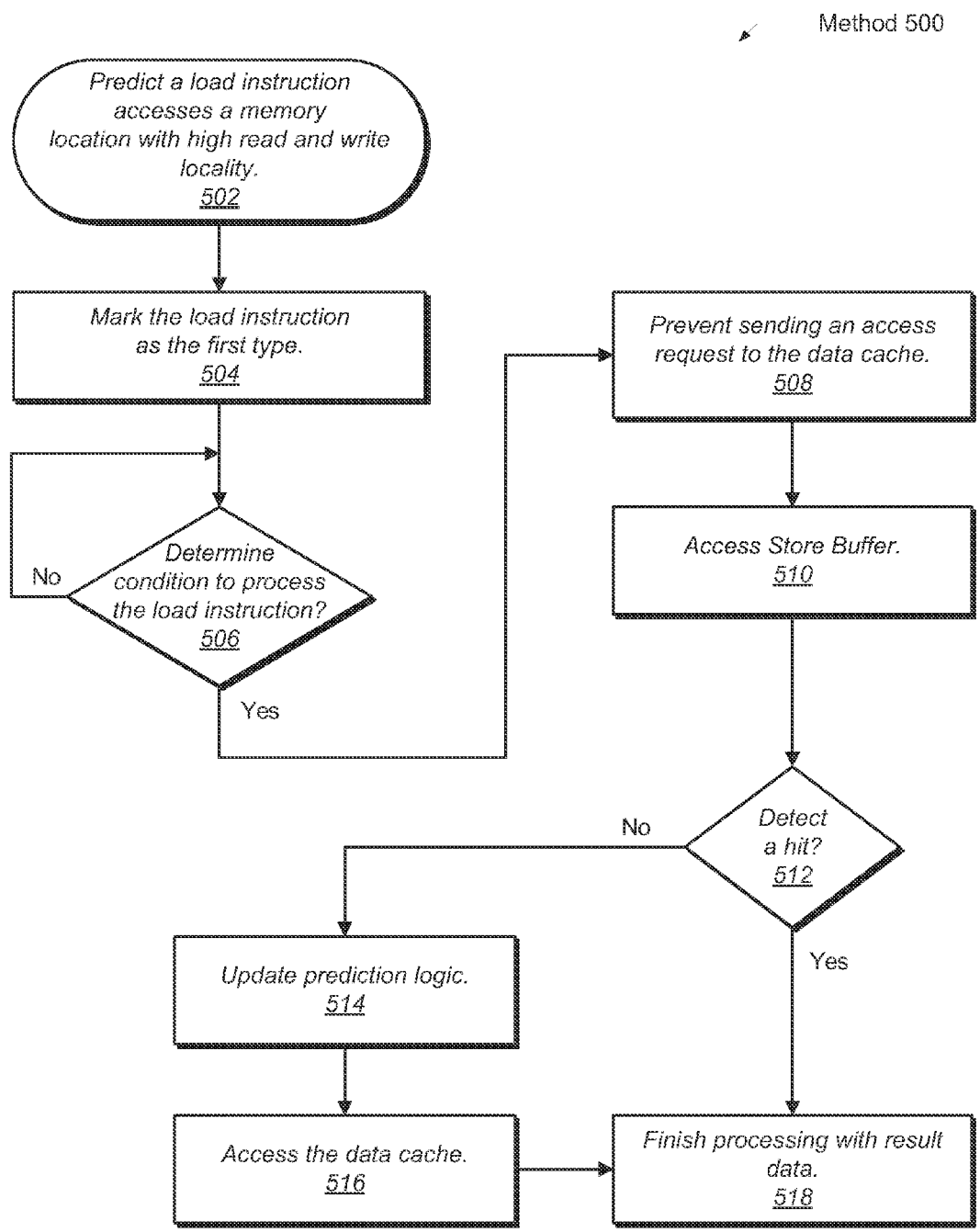
FIG. 5 is a flow diagram of another embodiment of a method for an efficient cache efficiently predicting and processing of memory access dependencies.

Referring now to FIG. 5, a generalized flow diagram of another embodiment of a method 500 for efficiently predicting and processing of memory access dependencies is illustrated. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a load instruction (read operation) is predicted to be a first type, such as a stack access. The prediction may use source operands of the load instruction and may occur in a decode pipeline stage, an execution pipeline stage, or other as described earlier. In some embodiments, a data structure is used to store information for problematic load instructions. The data structure may store at least a program counter (PC) of a load instruction that does not behave as predicted. For example, a load instruction predicted to benefits from data forwarding from the store buffer may not have data forwarded from the store buffer. In another example, a load instruction predicted to not benefit from data forwarding from the store buffer may have data forwarded from the store buffer. In various embodiments, a multi-bit saturating counter may be incremented or decremented according to a detected misprediction.

The data structure storing information of problematic load instructions may be accessed in parallel with the prediction of whether the load instruction has high or low locality using source operands. Alternatively, the data structure may be accessed after the prediction using source operands. If information for the load instruction, such as at least the PC, is stored in the data structure, then the presence of the information (simply an allocated entry that produces a hit during a search with the PC) or a determination that a stored value exceeds a threshold, such as a multi-bit saturating counter, may switch the original prediction. If information in the data structure does not produce a hit during a search or provides a value that does not exceed a threshold, then the original prediction using the source operands may not be changed or switched. If the prediction is changed from the load instruction being the first type, then other processing may occur. Details of another type of processing are provided in the description for method 600.

In block 504, the load instruction is marked as the first type, such as a stack access. In some examples, a bit of information that follows the load instruction throughout the processor may be asserted or deasserted to indicate the load instruction is marked as the first type. The load instruction may be allocated in a load buffer. In some embodiments, a resolved load address is stored in the load buffer at this time. In other embodiments, the load address is resolved after allocation in the load buffer. An address generation unit (AGU) within either an execution unit or the load/store unit may resolve the load address.

Logic may determine whether a condition is satisfied to begin processing the load instruction. For example, in some embodiments, processing may begin when the load address is resolved. This condition may be used when designers wish to begin processing of the load instruction early. Typically, the load buffer, which stores information for outstanding load instructions, are searched by resolved store addresses when older store instructions have their store addresses resolved. However, if this search is delayed due to a change in processing, such as a change in a method for processing load instructions of a type different from the first type, then another search of the store buffer may occur. This other processing is further described later. The load instruction may access and search the store buffer a second time when all outstanding older store operations have resolved addresses.

In other embodiments, processing may begin when the load address is resolved and all outstanding older store operations have resolved addresses. This condition may be used when designers do not wish to begin processing of the load instruction early and prefer to access and search the store buffer only once. If it is determined a condition to begin processing the load instruction, such as at least the above example conditions, is satisfied (conditional block 506), then in block 508, the load instruction marked as the first type may be prevented from accessing the data cache.

In block 510, the load instruction marked as the first type may access the store buffer in the load-store unit (LSU) with a resolved load address. In some embodiments, the store buffer is indexed with the resolved load address. In other embodiments, the data forwarding may be more aggressive and an additional STLF predictor provides a store address to use to index the store buffer or a store entry ID in the store buffer before the load address is resolved. The STLF predictor may have been indexed earlier with a PC for the load instruction marked as the first type. If the store buffer is accessed and searched prior to all outstanding older store instructions have resolved store addresses, then later verification and recovery steps may be taken.

If a hit is detected during access of the store buffer (conditional block 512), then in block 518, the load instruction marked as the first type may finish processing with the result data forwarded from the store buffer and the load instruction may be marked as completed. If a miss is detected during access of the store buffer (conditional block 512), then in block 514, the prediction logic used for determining whether load instruction is the first type is updated. For example, the PC of the load instruction may now be stored or allocated in an entry in a data structure storing PCs of problematic load instructions. The problematic load instructions may not behave as predicted.

In other examples, the load instruction may already have an entry allocated in the data structure and have prediction information updated. For example, a multi-bit saturating counter may be incremented or decremented according to the misprediction. For subsequent processing of the load instruction, an access into the data structure as described for block 502 above may be used to provide a prediction of whether the load instruction is the first type. In block 516, the load instruction marked as the first type may now access the data cache although it was previously blocked from accessing the data cache. Following, in block 518, the load instruction originally marked as the first type may finish processing with the result data received from the data cache.

Figure 6:
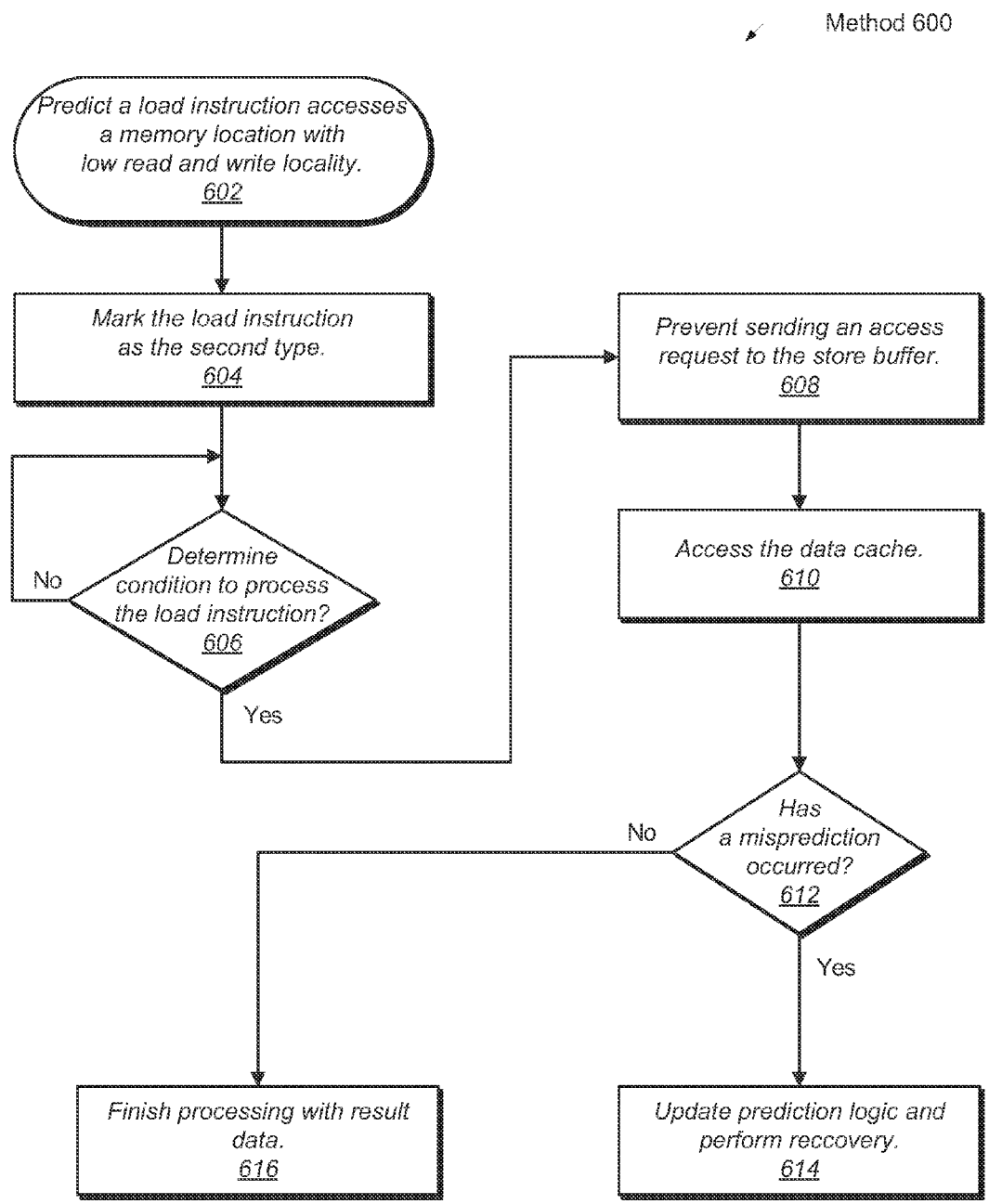
FIG. 6 is a flow diagram of another embodiment of a method for an efficient cache efficiently predicting and processing of memory access dependencies.

Turning now to FIG. 6, a generalized flow diagram of another embodiment of a method 600 for efficiently predicting and processing of memory access dependencies is illustrated. For purposes of discussion, the steps in this embodiment are shown in sequential order. However, some steps may occur in a different order than shown, some steps may be performed concurrently, some steps may be combined with other steps, and some steps may be absent in another embodiment.

In block 602, a load instruction (read operation) is predicted to be the second type, such as a non-stack access. Heap accesses are a subset of non-stack accesses. The prediction may use source operands of the load instruction and may occur in a decode pipeline stage, an execution pipeline stage, or other as described earlier. In some embodiments, a data structure is used to store information for problematic load instructions. The data structure may store at least a program counter (PC) of a load instruction that does not behave as predicted. The data structure may be used as described earlier, such as in the description for method 500.

In block 604, the load instruction is marked as the second type with low locality, such as a non-stack access. In some examples, a bit of information that follows the load instruction throughout the processor may be asserted or deasserted to indicate the load instruction is marked as the second type.

Similar to the steps in method 500, the load instruction marked as the second type may be allocated in a load buffer. Logic may determine whether a condition is satisfied to begin processing the load instruction.

If it is determined a condition to begin processing the load instruction is satisfied (conditional block 606), then in block 608, in some embodiments, the load instruction marked as the second type may be prevented from accessing the store buffer. In such a case, verification may be performed later as described shortly. In other embodiments, the load instruction marked as the second type may access and search the store buffer with the load address when the load address is resolved. If a hit occurs, then any access to the data cache may be cancelled. The load instruction may wait for all outstanding older store instructions to resolve their addresses in order to determine the youngest of the older store instructions from which to receive forwarded data.

In block 610, the load instruction marked as the second type sends a memory access request to the data cache with the resolved load address. The load address may have been translated in a corresponding TLB. As described earlier, in some embodiments, the load instruction marked as the second type may access and search the store buffer with the load address when the load address is resolved. In these cases, store addresses may be used to access and search the load buffer. In some embodiments, the search of the load buffer occurs when the store addresses are resolved. In addition or alternatively, the search of the load buffer occurs when the store instructions are ready to retire. Control logic determines whether a hit occurs on a resolved load address in the load buffer for a younger load instruction marked as the second type and marked as completed. If such a hit occurs, then a misprediction has occurred.

If a misprediction has occurred for the load instruction (conditional block 612), then in block 614, the prediction logic used for determining whether the load instruction is the second type is updated. For example, the PC of the load instruction may now be stored or allocated in an entry in a data structure storing PCs of problematic load instructions. The problematic load instructions may not behave as predicted. The update of the prediction logic may occur in a similar manner as described earlier for block 514 in method 500.

The load instruction marked as the second type may be cancelled. Additionally, younger dependent instructions that have already issued or are being scheduled to issue may be cancelled. A load replay or other recovery mechanism may be used to ensure correct operation for the load instruction. If a misprediction has not occurred for the load instruction (conditional block 612), then in block 616, the load instruction marked as the second type may finish processing with the result data received from the data cache. As seen from the above methods 400-600, the accompanying description, and the remainder of the description, a load instruction may be marked as one of multiple types. The type may determine how the load instruction is processed. Examples of the types include at least stack accesses, non-stack accesses, mispredicted or problematic load instructions, and so forth.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. In addition, it is to be understood that the described computing system may be part of processor used in any suitable device, such as a desktop computer, laptop computer, server, handheld computing device, set-top box, router, or otherwise.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a store buffer;
   a data cache; and
   control logic configured to:
      determine an instruction is a load instruction;
      mark the load instruction as a candidate for store-to-load (STL) data forwarding, in response to predicting the load instruction has a memory dependence on an older outstanding store instruction, wherein said predicting is based on determining a source operand of the load instruction corresponds to a stack memory region;
      in response to detecting the load instruction is marked as a candidate for STL data forwarding, process the load instruction as if the load instruction is dependent on an older store instruction;
      in response to detecting the load instruction is not marked as a candidate for STL data forwarding, process the load instruction as if the load instruction is not dependent on an older store instruction;
      to process the load instruction as if the load instruction is dependent on an older store instruction, prevent access of the data cache to obtain result data for the load instruction and access the store buffer to obtain the result data; and
      to process the load instruction as if the load instruction is not dependent on an older store instruction, prevent access of the store buffer to obtain the result data and access the data cache for the result data.

2. The computing system as recited in claim 1, wherein determining a source operand of the load instruction corresponds to a stack memory region comprises one or more of determining a source operand of the load instruction corresponds to a stack pointer register, and determining an immediate address in the load instruction is within a given address range for a stack.

3. The computing system as recited in claim 1, wherein to mark the load instruction as a candidate for STL data forwarding, the control logic is configured to assert a bit associated with the load instruction.

4. The computing system as recited in claim 1, wherein to determine said predicting is inaccurate, the control logic is further configured to determine the load instruction marked as the candidate for STL data forwarding indexes into the store buffer with a corresponding load address and misses.

5. The computing system as recited in claim 1, wherein in response to detecting the load instruction is marked as a candidate for STL data forwarding, the control logic is further configured to wait for all outstanding store instructions older than the load instruction to resolve store addresses of said all outstanding store instructions before determining whether the load instruction has a dependency on an older store instruction.

6. The computing system as recited in claim 1, wherein to mark the load instruction with an indication that the load instruction is not a candidate for STL data forwarding, the control logic is configured to dessert a bit associated with the load instruction.

7. The computing system as recited in claim 1, wherein to determine that a load instruction not marked as a candidate for STL data forwarding is dependent on an older store instruction, the control logic is further configured to determine:
   an outstanding store instruction older than the load instruction has a same address as the load instruction not marked as the first type; and
   the load instruction not marked as a candidate for STL data forwarding is indicated as having received data from the data cache.

8. The computing system as recited in claim 7, wherein the control logic is further configured to compare addresses of said store instruction and the load instruction not marked as a candidate for STL data forwarding when said store instruction is ready to retire.

9. The computing system as recited in claim 1, wherein the computing system further comprises a data structure, wherein the control logic is further configured to:
   mark the load instruction as not being a candidate for STL data forwarding in response to determining the load instruction is not dependent on an older store instruction; and
   store an identification of the load instruction in the data structure in response to determining said predicting is inaccurate.

10. The computing system as recited in claim 9, wherein the control logic is further configured to:
   access the data structure with the identification the load instruction after said predicting and prior to determining whether the predicting is accurate; and
   in response to detecting the identification matches an entry in the data structure, change the marking of the load instruction from an indication that the load instruction is not a candidate for STL data forwarding to an indication that the load instruction is a candidate for STL forwarding, or vice-versa.

11. A method executable by at least one processor, the method comprising:
   determining an instruction is a load instruction;
   marking the load instruction as a candidate for store-to-load (STL) data forwarding, in response to predicting the load instruction has a memory dependence on an older outstanding store instruction, wherein said predicting is based on determining a source operand of the load instruction corresponds to a stack memory region;
   in response to detecting the load instruction is marked as a candidate for STL data forwarding, processing the load instruction as if the load instruction is dependent on an older store instruction;
   in response to detecting the load instruction is not marked as a candidate for STL data forwarding, processing the load instruction as if the load instruction is not dependent on an older store instruction;
   to process the load instruction as if the load instruction is dependent on an older store instruction, preventing access of a data cache to obtain result data for the load instruction and accessing a store buffer to obtain the result data; and
   to process the load instruction as if the load instruction is not dependent on an older store instruction, preventing access of a store buffer to obtain the result data and accessing a data cache for the result data.

12. The method as recited in claim 11, wherein determining a source operand of the load instruction corresponds to a stack memory region comprises one or more of determining a source operand of the load instruction corresponds to a stack pointer register, and determining an immediate address in the load instruction is within a given address range for a stack.

13. The method as recited in claim 11, wherein to mark the load instruction as a candidate for STL data forwarding, the method comprises asserting a bit of information associated with the load instruction.

14. The method as recited in claim 11, wherein to mark the load instruction with an indication that the load instruction is not a candidate for STL data forwarding, the method comprises deasserting a bit of information associated with the load instruction.

15. A non-transitory computer readable storage medium storing program instructions, wherein the program instructions are executable to:
   determine an instruction is a load instruction;
   mark the load instruction as a candidate for store-to-load (STL) data forwarding, in response to predicting the load instruction has a memory dependence on an older outstanding store instruction, wherein said predicting is based on determining a source operand of the load instruction corresponds to a stack memory region;
   in response to detecting the load instruction is marked as a candidate for STL data forwarding, process the load instruction as if the load instruction is dependent on an older store instruction;
   in response to detecting the load instruction is not marked as a candidate for STL data forwarding, process the load instruction as if the load instruction is not dependent on an older store instruction; and
   in response to detecting the load instruction is marked as the candidate for STL data forwarding, wait for all outstanding store instructions older than the load instruction to resolve store addresses of said all outstanding store instructions before determining whether the load instruction has a dependency on an older store instruction.

16. The non-transitory computer readable storage medium as recited in claim 15, wherein determining a source operand of the load instruction corresponds to a stack memory region comprises one or more of determining a source operand of the load instruction corresponds to a stack pointer register, and determining an immediate address in the load instruction is within a given address range for a stack.

17. The non-transitory computer readable storage medium as recited in claim 15, wherein to determine said predicting is inaccurate, the program instructions are further executable to determine the load instruction marked as the candidate for STL data forwarding indexes into the store buffer with a corresponding load address and misses.

* * * * *